(12) United States Patent
Becchetti et al.

(10) Patent No.: US 7,878,131 B2
(45) Date of Patent: Feb. 1, 2011

(54) INTEGRATED PROCESS FOR WASTE TREATMENT BY PYROLYSIS AND RELATED PLANT

(75) Inventors: Francesco Becchetti, Rome (IT); Franz-Eicke Von Christen, Rome (IT)

(73) Assignee: BEG S.p.A., Rome (IT)

( * ) Notice: Subject to any disclaimer, the term of this patent is extended or adjusted under 35 U.S.C. 154(b) by 452 days.

(21) Appl. No.: 11/919,039

(22) PCT Filed: Apr. 28, 2006

(86) PCT No.: PCT/IT2006/000294

§ 371 (c)(1), (2), (4) Date: Oct. 23, 2007

(87) PCT Pub. No.: WO2006/117824

PCT Pub. Date: Nov. 9, 2006

(65) Prior Publication Data

US 2009/0020052 A1    Jan. 22, 2009

(30) Foreign Application Priority Data

May 2, 2005    (IT) .................. RM2005A0207

(51) Int. Cl.
*F23G 5/02* (2006.01)
*F23B 90/00* (2006.01)
*B02C 21/00* (2006.01)

(52) U.S. Cl. .............. 110/230; 110/220; 110/226; 110/222; 110/342; 241/23; 241/65

(58) Field of Classification Search .......... 110/220, 110/221, 224, 226, 229, 230, 341, 342, 346; 241/23, 24.1, 24.11, 24.12, 65, 68
See application file for complete search history.

(56) References Cited

U.S. PATENT DOCUMENTS

| 4,133,273 | A | * | 1/1979 | Glennon ............... 110/346 |
| 4,398,476 | A | * | 8/1983 | Suzuki et al. ........... 110/346 |
| 4,541,345 | A | * | 9/1985 | Grumpelt et al. ....... 110/229 |
| 4,544,374 | A | * | 10/1985 | Mallek et al. ........... 110/229 |
| 5,290,327 | A | * | 3/1994 | Rossle ................... 110/229 |

(Continued)

FOREIGN PATENT DOCUMENTS

DE    196 08 093 A1    9/1997

(Continued)

*Primary Examiner*—Kenneth B Rinehart
*Assistant Examiner*—David J Laux
(74) *Attorney, Agent, or Firm*—Arent Fox LLP

(57) ABSTRACT

Process for solid waste treatment, and particularly municipal solid waste, with recovery of the thermal energy, which is based on the general pyrolysis process modified in order to improve, on the one hand, the energy yield and, on the other, to reduce the quantity of unusable solid residues to be sent to the waste disposal, the unusable solid waste being limited to 10-15% of the total weight of the initial residue. The process and relative plant include a boosted treatment of the incoming waste, with a preliminary separation into three solid fractions, the first one of which is separately subjected to a preliminary drying step and the third one undergoes further shredding. The process and relative plant also include a section for recovering energy from the pyrolysis coke, wherein the latter is subjected to a thermochemical treatment with the production of a further quantity of synthesis gas.

19 Claims, 5 Drawing Sheets

U.S. PATENT DOCUMENTS

Figure 1:
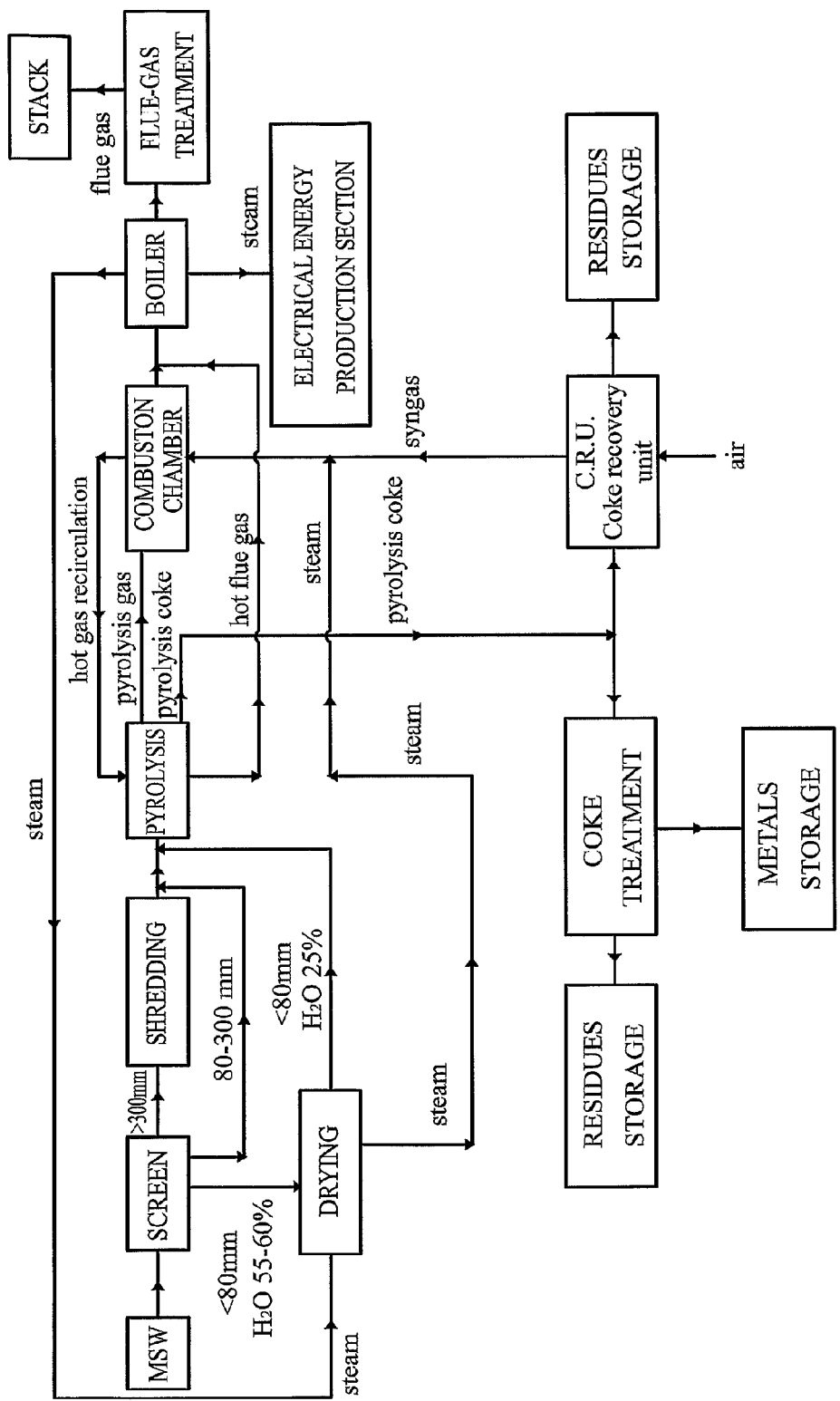

| | | | |
|---|---|---|---|
| 5,996,512 A * | 12/1999 | Morin et al. | 110/229 |
| 6,840,184 B2 * | 1/2005 | Eberhardt et al. | 110/341 |
| 6,871,603 B2 * | 3/2005 | Maxwell | 110/229 |
| 7,302,897 B2 * | 12/2007 | Pallett et al. | 110/342 |
| 2003/0196577 A1 * | 10/2003 | Lefcort | 110/342 |
| 2006/0005749 A1 * | 1/2006 | Shih et al. | 110/342 |

FOREIGN PATENT DOCUMENTS

| | | |
|---|---|---|
| DE | 196 09 721 A1 | 9/1997 |
| DE | 199 37 524 A1 | 2/2001 |
| DE | 103 33 279 A1 | 4/2004 |
| EP | 0 545 241 A | 6/1993 |
| WO | WO 2005/066315 A | 7/2005 |

* cited by examiner

INTEGRATED PROCESS FOR WASTE TREATMENT BY PYROLYSIS AND RELATED PLANT

The present invention concerns an integrated process for waste treatment by pyrolysis and the relative plant. More specifically, the invention concerns a method for processing solid waste, and particularly municipal solid waste, with recovery of thermal energy, which method exploits the general pyrolysis process suitably modified in order to improve the energy yield of the process, on the one hand, and to reduce the quantity of unusable solid waste to be sent to the waste tip, on the other.

As is known, solid waste—and particularly the waste produced and collected by municipal communities—which generally includes household solid waste and commercial waste in the form of rejects and packagings from markets, shops and small craft workshops, has traditionally been sent to open-air or underground landfills for disposal, or sent to incinerators. The first form of waste disposal, which is still the most widespread, particularly in less industrialised countries, is always extremely intrusive as regards environmental impact. Its planning requires particular attention to the choice of site location and preparation—firstly, because depositing waste directly on the ground and its consequent exposure to atmospheric agents and to climatic conditions involves a constant leaching of the soluble substances contained in the waste and their seepage into the soil, as well as the development of undesirable biological processes. Actually, the absence of suitable protective water-proof linings beneath the landfill site has often caused serious problems of pollution to underground aquifers.

The traditional solution of incineration of solid waste is obviously more expensive because it involves the setting up of treatment systems for combustion flue gases and, if these systems are not adequately designed or managed, it involves a considerable risk of atmospheric pollution.

The growing demand for electric power, together with the scarcity of mineral oil reserves, is steering the international community towards the search for new technologies that can produce electrical energy from non-conventional and so-called "renewable" sources. Among these, there is also waste, for its characteristic of being a material that is continuously produced and whose only possible destination (apart from the reclaiming of some recyclable components) is its final disposal. It must also be borne in mind that the more recent environmental legislation envisages that waste must no longer be disposed of directly in waste disposal sites without undergoing treatment beforehand.

In view of the above, it is evident that the use of waste as fuel in dedicated plants, by reducing the use of traditional fuels such as petroleum, natural gas, combustible oils or coal, and minimising the use of landfills, is an extremely convenient choice both as regards environmental protection and as regards energy saving.

There are currently two known types of conventional "waste to energy" plants for producing energy from waste. One kind is the "thermovalorization" plant, consisting of incineration facilities where there is a recovery of the heat given off from burning the waste to activate steam generators, with electricity production through steam turbines. The other type, known as a "gasification" plant, is also fed with fuel deriving from waste produced in dedicated structures; here, though, the fuel is not burnt but converted into a gaseous feeder fuel that can produce energy or be the basis for chemical syntheses. In both cases, the processes—in the current plant arrangements—still generate waste products that are on average 50% of the weight of the waste treated.

Alongside these there is increasing consideration of the solid waste treatment process normally called by "pyrolysis" which, in its general lines, includes a waste pre-treatment phase followed by a waste pyrolysis phase carried out in a reactor, with suitable temperature conditions and times, resulting in the production of a gaseous stream (pyrolysis gas) and a solid residue (pyrolysis coke). At the reaction conditions the various waste components lose water, depolymerise and decompose, giving rise to products of inceasingly lower molecular weight, with the evolution of volatile and gaseous products and a solid residue enriched in carbonaceous material. Besides the composition of the starting waste products, the composition of the pyrolysis gas and coke depends on the type of reactor in which pyrolysis takes place and the operating conditions, and specifically the reaction time and temperature.

The conventional pyrolysis processes for solid waste yield—as final products—a gaseous stream (pyrolysis gas), on the one hand, from which energy is recovered in the same way as with other processes, and, on the other, a solid residue—pyrolysis coke—to be mostly sent to waste disposal. The latter, which accounts for an average of 30% of the weight of the starting solid waste feed, could be used as fuel, for example in coal-fired power stations, only if mixed in quite small quantities with respect to the normal coal feed, because it has a pollutant content (including sulphur, in particular) that is too high to be burnt in a normal power station.

To improve energy yields and to reduce the quantities of residues to be disposed of later, several variants of the conventional solid waste treatment process by pyrolysis have been devised which are variously based on pyrolysis-combustion combinations, or pyrolysis and gasification, in order to boost energy recovery to the utmost and minimise the quantity of solid residue obtained.

One of these variants, developed by Siemens KWU (pyrolysis-combustion process; K. J. Thomé-Kozmienski, *Thermische Abfallbehandlung*, EF-Verlag für Energie-und Umwelttechnik, Berlin, 1994) for the treatment of municipal solid waste, combines a pyrolysis phase with a subsequent high-temperature combustion phase both of the solid residue and of the gaseous current obtained by pyrolysis, so as to virtually eliminate every solid residue. The pyrolysis-combustion process envisages a preliminary phase of shredding the waste all together, up to reaching maximum sizes of about 200 mm. This waste is possibly integrated with sludges coming from sewage systems in order to regulate the consistency of the feed, and everything is then treated in a rotary drum pyrolysis reactor of the conventional type, with the production of a pyrolysis gas and a carbonaceous solid residue, from which recoverable materials are separated, like ferrous metals and glassy residues. Both the pyrolysis gas and carbonaceous residue, devoid of the metal and glass components, are brought together and burnt in a high-temperature combustion chamber to produce thermoelectric energy through a steam boiler.

Another of the variants proposed for the conventional process for treating waste solids by pyrolysis, and called the "Thermoselect process" (F. J. Schweitzer ed., *Thermoselect-Verfahren zur Ent-und Vergasung von Ab-fällen*, EF-Verlag für Energie-und Umwelttechnik, Berlin, 1994), combines a treatment of drying, partial pyrolysis and gasification of the solid waste, previously compacted by means of a hydraulic press up to about 10% of its starting volume, to a gasification treatment of the solid product obtained from the pyrolysis, directly on exiting the degasification and pyrolysis tunnel.

The latter is not a rotary drum, but a channel having rectangular-section which ends by opening up directly inside a high-temperature reactor, cylindrical with vertical axis, in which pyrolysis is completed and the gasification of the pyrolysis coke thus obtained takes place. The synthesis gas that is discharged from the upper section of the high-temperature reactor constitutes the desired product, which after undergoing the necessary operations of quenching, separation of the dragged solid particles and filtering, can be used for producing energy or for gaseous products synthesis. From the lower section of the high-temperature gasification reactor only mineral and metal constituents in melted form are discharged.

A third variant proposed for a process for treating solid waste in which a pyrolysis phase is combined with a gasification phase is the one known as the "Noell process" (J. Carl, P. Fritz eds., NOELL-*Konvenrsions-verfahren zur Verwertung und Entsorgung von Abfällen*, EF-Verlag für Energie- und Umwelttechnik, Berlin, 1994), in which the solid waste is first broken down to fragments smaller than 50 mm, possibly undergoing a preliminary drying phase, and is then fed to a pyrolysis reactor of the rotary drum type with horizontal axis. The latter produces a solid made up of pyrolysis coke that is purified from the metal materials and then fed to a mill to be ground to the appropriate size necessary in order to make up—together with the gas obtained from the pyrolysis drum—a feed suitable for a vertical-axis entrained-bed bed gasifier. In this case, too, the pyrolysis gas and coke are again re-united after pyrolysis in order to undergo the gasification phase, thus producing—after suitable separations of the melted granules—condensates and dragged solid particles, as well as a synthesis gas (syngas) to be used for producing energy or for gaseous products synthesis.

On the grounds of the foregoing prior art, the object of the present invention is thus to provide an integrated process for solid waste treatment, in particular, but not exclusively, for the treatment of that waste normally collected as municipal solid waste (MSW) through the specific municipal services, which process uses the conventional pyrolysis process in an improved way, suitably combining it with gasification operations of the carbonaceous residue obtained from pyrolysis. The process is thus intended to drastically reduce the quantities of final solid residues that must be sent to the landfill, in the event that these residues cannot conveniently be used as feed material to be mixed in small quantities with the coal used in coal-fired power stations. A further object of the present invention is to provide an improved process for the treatment of solid waste which, although having a simple configuration and of requiring a non-complex management, enables increasing the overall energy yield of the process itself, in particular increasing the heating power of the pyrolysis gas and thus of the synthesis gas (syngas) obtained.

To this end, the present invention proposes adopting two fundamental variants to a conventional process for waste treatment by pyrolysis:

- a more boosted treatment of the incoming waste, with a preliminary separation of this waste into three specific fractions according to waste type and size: the first fraction, of smaller size and containing more humidity (being mainly composed of organic residues), being subjected separately to a preliminary drying phase;
- an additional phase of energy recovery from the coke produced by the pyrolysis process, in which such fraction is subjected to a thermochemical treatment of gasificaton in specific reactors of a rotary drum type (that is, of a type substantially similar to the reactors in which the previous pyrolysis phase was carried out), with the production of a further quantity of gas (syngas) to be later added to the pyrolysis gas for energy recovery.

By operating according to the proposals of the present invention, on the one hand, the moisture content of the waste is standardised by taking it to an average value of 25-30%, and thus increasing the heat-generating power of the pyrolysis gas produced, and, on the other, greater heat and electricity yields are obtained by the plant, since the syngas produced by gasification of the pyrolysis coke is burnt in the same combustion chamber provided for the pyrolysis gas. As already noted, besides the advantages in terms of thermal energy, the plant operating according to the proposed process (called the Waste Alternative Energy Recovery—or WALTER—process) can considerably reduce the production of process residues—from 30% of pyrolysis plants operating with traditional methods to 10-15% obtainable with a plant operating according to the proposed process.

Hence, the present invention specifically provides a process for the treatment, by pyrolysis, of solid waste made up at least in part of municipal solid waste, wherein the waste to be treated undergoes a pyrolysis stage inside one or more rotary drum reactors, with the production of a pyrolysis gas stream and a carbonaceous solid residue essentially composed of pyrolysis coke, characterised by the fact that the said waste to be treated is preliminarily separated into at least two fractions, the first one of which, of smaller particle size and greater moisture contents, is subjected to a preliminary drying step in one or more rotary drum driers before being fed—together with the other waste fractions—to the said pyrolysis stage, and by the fact that the said carbonaceous solid waste obtained from the pyrolysis stage is further subjected to a gasification step to recover a further synthesis gas (syngas) fraction, which is subsequently added to the said pyrolysis gas stream to be fed to an energy recovery stage with the production of thermal energy, the solid residue of the said gasification step substantially representing the final waste matter of the entire process.

Preferably, the waste to be treated is preliminarily separated into three fractions which include, besides the said first fraction of smaller particle size and greater moisture contents and a second dry fraction of larger particle size than the first one, also a third fraction, dry and of even coarser size than the second one, which is subjected to a preliminary shredding step to homogenize its size to the said second fraction before being fed, together with the other waste fractions, to the said pyrolysis stage.

The first fraction of smaller particle size and greater moisture contents has size lower than 80 mm and an initial humidity ranging between 55% and 60%, while the residual humidity after the said preliminary drying step is of 20-25%. This second dry fraction normally has size ranging between 80 mm and 300 mm, while the third dry fraction of even coarser size has starting size above 300 mm.

According to a preferred embodiment of the invention, the preliminary drying of the first waste fraction is carried out by using, as heating fluid in the said one or more rotary drum driers, steam drawn off in the said thermal energy production stage.

Also according to the present invention, the energy recovery stage with production of thermal energy is carried out by subjecting the said pyrolysis gas stream and the said synthesis gas stream (syngas) to combustion inside a combustion chamber, with the production of heat which is used to heat the pipes of a steam boiler. The one or more rotary drum pyrolysis reactors according to the process proposed are indirectly heated by circulating, outside each of the said drums, the gases drawn off from the said combustion chamber.

Preferably, the aforesaid gasification step for recovering a further synthesis gas fraction is carried out by feeding the said carbonaceous solid waste obtained from the pyrolysis stage, after eliminating any ferrous components, into one or more rotary drum gasification reactors, with the production of the said further synthesis gas fraction as a gaseous product, and a solid residue further depleted of carbon as the final waste of the process.

As already noted, the quantity of solid residue obtained from the gasification operation is 10-15% of the total weight of the initial waste material fed into the process. Considered in volumetric terms, the quantity of solid residue obtained from the process is 5-10% of the total volume of the initial waste material fed into the process.

According to a further aspect thereof, the present invention provides a plant for the treatment, by pyrolysis, of solid waste made up at least in part of municipal solid waste according to the process described in claim 2, comprising the following interconnected main elements:

A) a waste reception and storage section;
B) a waste pre-treatment section providing for separation of the waste into three fractions of which the first one, of smaller particle size and greater moisture contents, is fed into one or more rotary drum driers, and the third one, dry and of coarser size, is fed to one or more shredders;
C) a section for the pyrolysis of the three waste fractions coming from the previous pre-treatment section and brought together, comprising one or more rotary drum pyrolysis reactors, which yield a pyrolysis gas stream and a carbonaceous solid residue;
D) a gasification section for the carbonaceous solid residue obtained from the previous section, comprising one or more rotary drum gasification reactors, which yield a synthesis gas stream and a solid residue substantially representing the final waste matter of the entire process;
E) a thermal energy production section starting from the said joint streams of pyrolysis gas and synthesis gas, comprising a combustion chamber for the said gases;
F) a section for the treatment and evacuation of flue gas with an annexed stack; and, preferably,
G) an electrical power production section starting from the said thermal energy produced in section E), comprising a steam generator that feeds a steam turbine connected to a power generator.

As already noted, the waste separation into three fractions is preferably carried out by passing the waste material into one or more rotary screens. Still according to some preferred design solutions, wherein the rotary drum driers use, as heating fluid, some of the steam drawn off from said steam generator, while the rotary drum pyrolysis reactors use, as heating fluid, the hot gases drawn off from the said combustion chamber.

Further according to some specific design solutions, in the plant according to the present invention downstream of each pyrolysis reactor, along the path of the pyrolysis gas, there is provided an electrostatic separator (32) for depulverising the said pyrolysis gas.

Preferably, the rotary drum gasification reactors are fed with air as the gasification agent, which is fed in through controlled injection diffusers, as it will be made clearer with reference to the drawings referred to below.

Among the further specific elements of the plant according to the present invention, there is also a section for treating the solid residue representing the final waste matter of the process, with a waste quenching pool, provided for in the carbonaceous solid residue gasification section, a section for eliminating the ferrous components from the carbonaceous solid residue obtained from the pyrolysis, provided for in the pyrolysis section, and, finally, a a bag-type cloth filter and a dry reactor for removing mercury and other pollutants by means of active carbon and hydrated lime, provided for in the flue gas treatment section.

Figure 2:
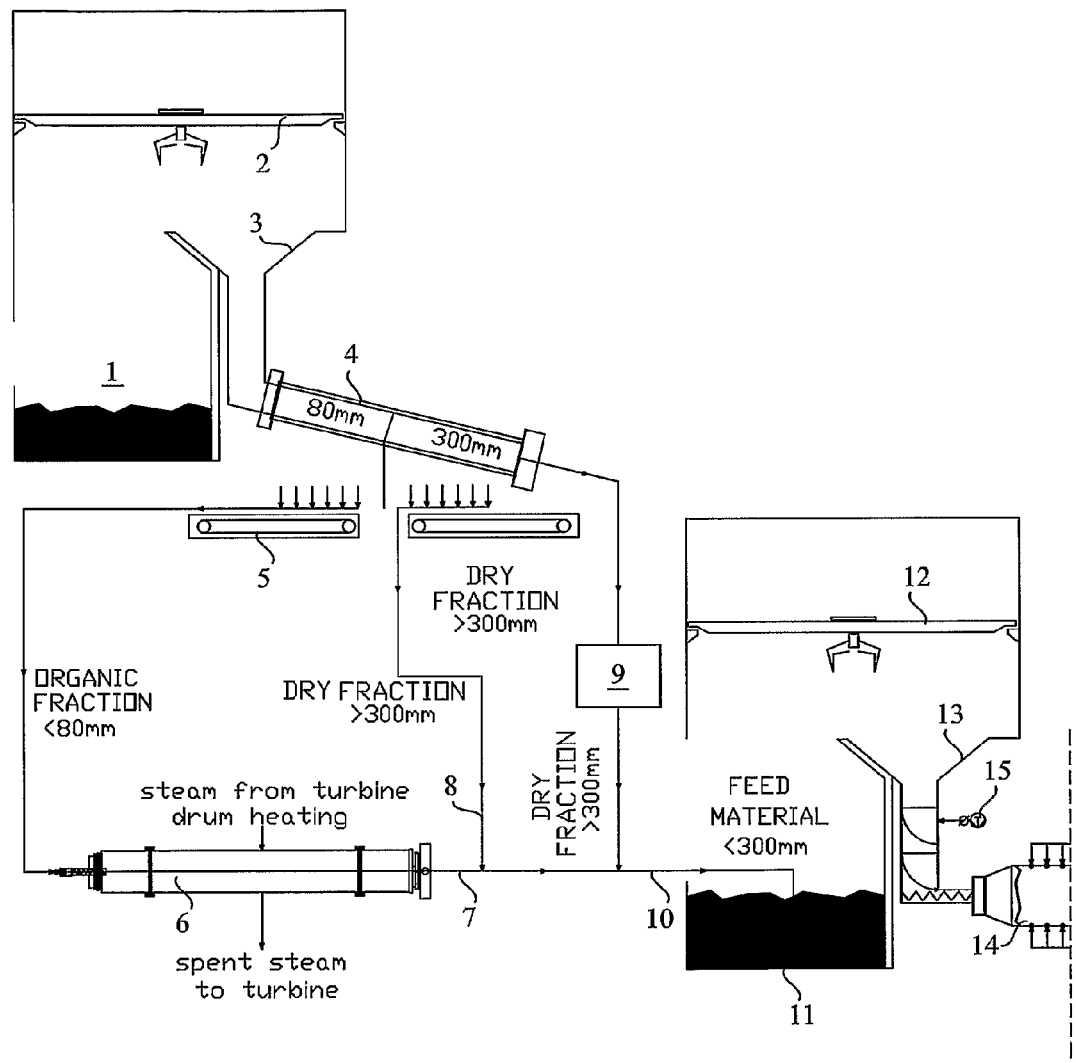
Figure 3:
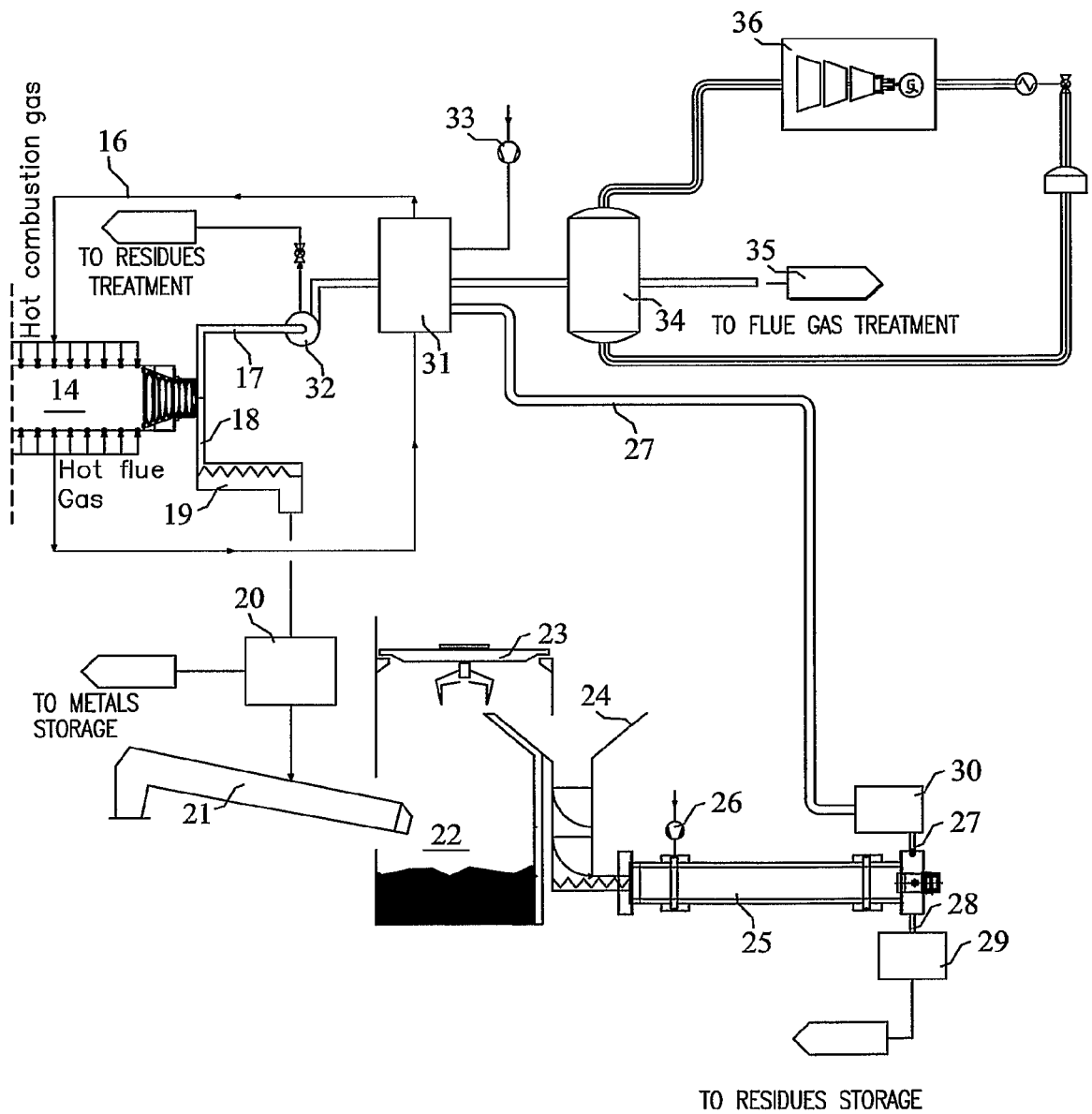
Figure 4:
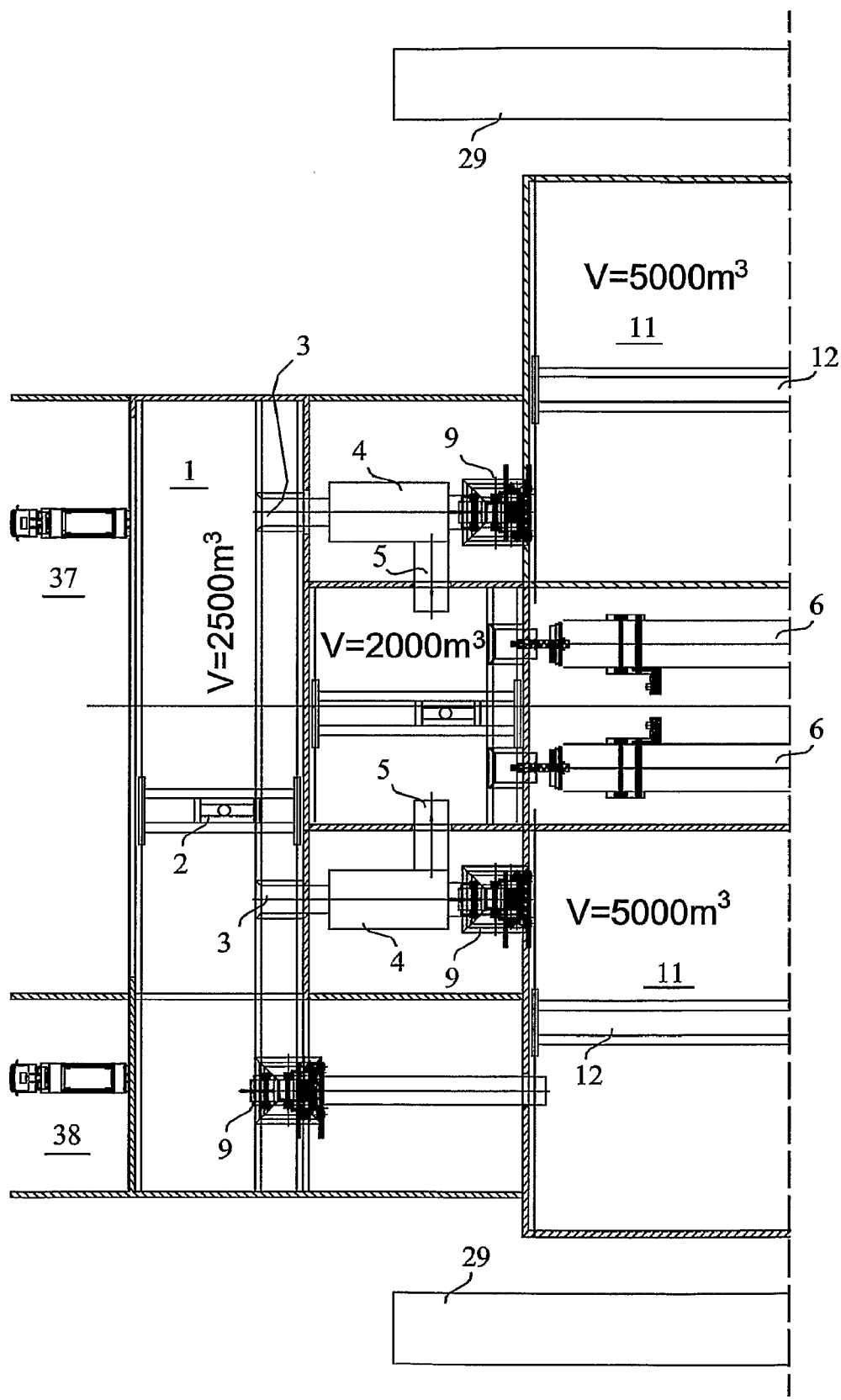
Figure 5:
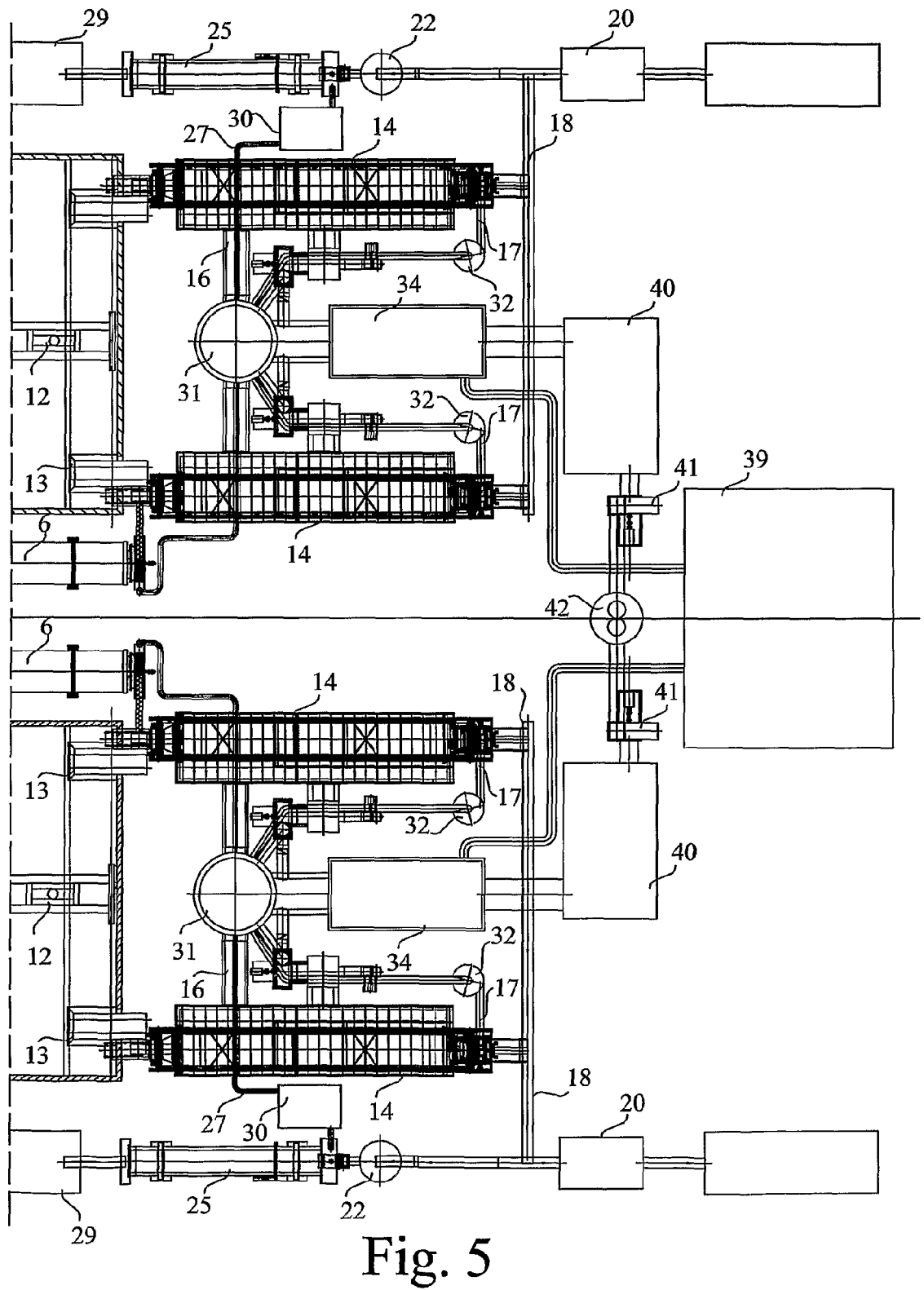

The specific features of the present invention, as well as its advantages and the relative operative modalities, will be more evident with reference to the detailed description presented merely for exemplification purposes below, and illustrated also in the attached drawings, wherein:

FIG. 1 is a flow chart with functional blocks showing an embodiment of the process according to the present invention;

FIGS. 2 and 3 taken together show the two parts of a process chart of an embodiment of the process according to the present invention; and FIGS. 4 and 5 taken together show the two parts of a simplified plant layout of an embodiment of the plant according to the present invention.

As schematically illustrated in the block diagram of FIG. 1, the process according to the present invention is designed for the treatment of solid waste coming, for example, from municipal waste collection services, which is indicated in the diagram with the overall term MSW (municipal solid waste). For exemplification purposes, undifferentiated municipal solid waste can have a low heat value (LHV) of 10,000 kcal/kg and the following indicative composition:

| Component | % weight in dry fraction |
| --- | --- |
| Inert elements | 21.95 |
| Carbon | 41.25 |
| Hydrogen | 5.48 |
| Oxygen | 29.62 |
| Nitrogen | 1.15 |
| Sulphur | 0.17 |
| Chlorine | 0.38 |
| Water | 35 (on the MSW as such) |

The treatment process according to the present invention, as shown in FIG. 1, enables to efficiently transform, without any excessive plant and management complexity, the MSW feed into the following final products: flue gases which, after suitable purification, are disposed of via the stack, a fraction of metals which are recovered and a fraction of solid waste having the characteristics required by European legislation in order to be safely disposed of in landfill—this waste does not exceed 10-15% of the total weight of the initial solid waste fed to the process, and is not more than 5-10% of its initial volume.

The first one of the innovative sections of the process, still with reference to FIG. 1, is the one which contemplates an initial screening operation in order to divide the MSW into three fractions, of which the fraction with greater moisture contents and smaller particle size is fed to a drying step, while the dry fraction having larger size is subjected to shredding. FIG. 1 also shows that the heating fluid necessary for drying the first fraction is obtained by drawing it off from the steam generator (boiler) designed for electric power generation.

The second innovative section of the process, with respect to a conventional process for treating MSW by pyrolysis, envisages an additional treatment of the coke coming from pyrolysis. As schematically shown in FIG. 1, the pyrolysis coke is first treated to recover the metal material, particularly ferrous metals, and is then sent to a storage area, from which it is taken in order to undergo a further gasification treatment (in the coal recovery unit—CRU). This further operation, carried out with air as a gasification fluid, yields the final residue, which can be sent to a landfill for disposal, and a further amount of gas useful for producing thermal energy (syngas), which is fed into the combustion chamber along with the pyrolysis gas.

The diagram of FIG. 1 further shows the thermal energy production operations starting from the two gases fed to the combustion chamber, the recirculation of an amount of hot gases from the combustion chamber for indirectly heating the pyrolysis reactor, the production of electricity starting from the thermal energy obtained in the combustion chamber and the treatment of the combustion flue gases obtained as exhaust gases after supplying the thermal energy to the power generator section.

With reference to FIGS. 2 and 3, the plant for carrying out the process according to the present invention includes a tank or pit (1) for receiving, storing and handling the waste. The storage pit (1) is, as generally used, a single space with no internal partitions in order to facilitate the mixing of waste and thus maximise the uniformity of energy characteristics of the feed. This allows maximising the energy recovery yields while, at the same time, optimising emissions in the atmosphere.

The waste in the storage pit (1) is mixed and distributed by an overhead-traveling crane (2), and then taken and conveyed to the hopper (3) of the rotary screen (4) in order to separate the waste into three classes of different particle size. The crane (2) is complete with a grabhook bucket, a control station, rails, an electric control panel, and hanging type electrical power supply system.

The rotary screen (4) is equipped with two consecutive grids of different sizes enabling the separation of the following material flows:

a moist fraction ($\phi$<80 mm) mostly composed of coarse organic substances;
  a dry fraction (80 mm<$\phi$<300 mm) mainly composed of materials of medium-to-high heat value (plastics, rags, rubbers, etc.);
  a dry fraction ($\phi$>300 mm) mainly composed of high heat value materials (paper, plastics, rags, rubbers, etc.) of larger size.

The moist organic fraction ($H_2O$ content≈55-60%) is separated in the first part of the rotary screen (4) by passing through 80 mm mesh and is then fed, by means of conveyor belts (5), to one of the fundamental sections of the plant, the organic component drying section. By means of a drying drum (6) rotating in a horizontal plane (or, rather, tilted by a few degrees to allow the material to move forward towards the exit end while the rotating), it is possible to dry the incoming material and to obtain an exiting material presenting a humidity level approaching 20%. The steam necessary for heating the drying drum (6) is drawn off from the feeder circuit of the steam turbine (36) for electric power production.

As already noted, by operating in this way on just the organic fraction it is possible to reduce a large amount of moisture, with two fundamental advantages:

1. an increase in load capacity of the plant (the quantity of waste fed to the pyrolysis drum (14) is lower compared to the waste treated by the plant);
  2. an increase in the qualitative characteristics of the pyrolysis gas produced (since the gas contains lower quantities of water vapour, a greater heat value is obtained, with undoubted advantages for electricity production and thus on the electric power yield of the whole plant).

The dried organic fraction (7) is mixed with the dry fraction (8) which has a maximum diameter lower than 300 mm. The coarser dry fraction with a diameter of over 300 mm is instead crushed in a specific shredding section (9) in order to reduce the maximum size of the material to 300 mm. This operation is necessary to standardise the size of material entering the pyrolysis drum (14) in order to increase its specific surface for a better performance of the pyrolysis process.

The three fractions brought together, hereinafter called "feed material" (10), having a uniform moisture content of 20-25%, are sent to the feed material storage pit (11), where they are mixed by means of an overhead-traveling crane (12). They are then taken and fed into the feed hopper (13) of the pyrolysis drum (14). At the same time, by means of a dosage pump (15), 8 kg of calcium hydroxide per ton of waste entering the pyrolysis drum (14) are fed to the process in order to trigger reactions that neutralise the acidic gases inside the pyrolysis drum (14). The latter rotates inside a specially designed refractory cylinder and is indirectly heated by the hot combustion gases (16) (at 1,200° C.) drawn off from the pipes connecting the combustion chamber (31) to the boiler of the steam generator (34) by means of automatically regulated valves. Thanks to the external heating system, the internal section of the pyrolysis drum (14) reaches temperatures in the region of 470-500° C.

Moreover, as already noted, the pyrolysis drum (14) operates in the absence of oxygen—an operating condition which is achieved by means of a slight depression applied to the drum itself (about 100 Pa, or 10 mmHg). In these operating conditions, the organic material decomposes and gasifies forming an actual combustible gas—pyrolysis gas (17)—which is drawn off by means of ducts connected to fully automated suction fans located before the plant stack (not shown), and also a solid residue—pyrolysis coke (18)—which is extracted from the lower part of the reactor (14) thanks to specially designed screw conveyors (19).

Once purified in a specific deferrization section (20) for removing the ferrous fraction, the coke is then sent to the storage pit (22) of the coke recovery section, by means of conveyor belts (21). Here, too, thanks to overhead-traveling crane (23), the coke is taken and sent via the feeder hopper (24) to a rotary drum reactor (25) called coal recovery unit (CRU), which carries out a gasificaton phase (thermochemical conversion) of the pyrolysis coke.

As with the organic fraction drying section, also the coal thermochemical conversion section is a fundamental part of the plant—which is innovative from a process standpoint with respect to the working schemes of conventional solid waste pyrolysis plants. With the further section for recovering the coke produced by the pyrolysis process, the total quantity of residues generated by the process as a whole is around 10-15% of the initial weight of the waste matter fed into the process, and the volume of these residues is about 5-10% of the starting volume of the solid waste.

The gasification drum (25) has a length of about twenty meters and a diameter of about 2.5 m. The air necessary for triggering the themochemical conversion reactions is provided by controlled injection diffusers (26), which regulate the incoming air according to the fixed stoichiometric ratio—in the case under examination this ratio is lower than the one theoretically required for the complete oxidation of the organic substances present in the incoming material. The reaching of the temperature of 800° C. necessary for triggering the reactions of the fed waste material is obtained by partial combustion reactions of the gas produced, without resorting to auxiliary heating systems.

The syngas (27) produced by the coke gasification process has a similar composition to the gases generated in the pyrolysis drum (14), with, however, a greater amount of carbon monoxide and hydrogen. The coke gasification process operates in counter-current in order to assure closer contact between coke and air so as to maximise the yield of the gas produced and also to minimise the carbon content in the residue produced. This residue (28) is discharged in the waste quenching pool (29) placed at the foot of the gasification reactor and is cooled here by the water.

The syngas (27) produced is extracted by controlled suction through a fan and made to pass through a treatment section (30). It is then sent via ducts into the combustion chamber (31), where it burns with the gas (17) produced by the pyrolysis process, appropriately depulverised by means of electrostatic separators (32). The air required for complete combustion of the inputted gas (17 and 27) is provided by a combustion air fan (33).

Downstream of the combustion chamber (31) a part of the hot gases, as already noted, is drawn off for heating the pyrolysis drum (14). These gases are then re-fed into the pipes leading to the steam generator (34) for the production of steam. The gases exiting the combustion chamber (31) enter the steam generator (34) in order to produce steam (Heat Recovery Steam Generator—the HRSG section). The steam generator (34) is of the multistage type with the production of overheated steam.

The gases exiting the steam generator (34) are cooled in order to reach a suitable temperature for being sent to the flue gas purification section (35).

The steam produced by the steam generator (34) feeds the steam turbine (36) connected to a turbogenerator for electric power production.

FIGS. 4 and 5 show a plan of a plant according to the present invention, which is developed essentially through the same elements already illustrated in FIGS. 2 and 3 (and in which the elements corresponding to those of FIGS. 2 and 3 are given corresponding reference numbers), but in which—because of the plant's capacity—there are two rotary screens (4), two drying drums (6), four pyrolysis drums (14), two rotary drum reactors (25) for pyrolysis coke gasification, two combustion chambers (31) with the relative steam generators (34) and the relative fume purification sections (35). Actually, the plant considered in FIGS. 4 and 5 develops on two pyrolysis lines, one line for flue gas treatment and one group of power generators, and is designed for a treatment capacity of about 120,000 tons of solid waste per year. The plant's treatment capacity is 385 tons of municipal solid waste a day, and the area available for the plant—shown together with all the construction details in FIGS. 4 and 5—is extremely compact, taking up only 2 hectares.

The plant has different waste input stations (37 and 38), one of which (38) is designed to receive industrial type waste. In this case, the sub-sequent treatment involves only one shredding section (9), but does not require, obviously, a drying section for the organic fraction as in the case of municipal solid waste. The dry residue of industrial origin is then stored in the same tank or pit (11) which receives the dry fraction of the residue of the municipal solid waste, after screening and shredding.

Without repeating the description of the corresponding elements already illustrated with reference to FIGS. 2 and 3, it must be noted that in this case the plant diagram shows—in the electricity production section (39)—the room housing the steam turbine (36 in FIG. 3) along with the power generator and all the other plant equipment connected to electricity production.

Finally, FIG. 5 also shows the flue gas treatment section which was generically shown in (35) in FIG. 3. In this case, it will be noted that the flue gases coming from two combustion chambers (31), after giving off heat in the two steam generators (34), pass into the flue gas treatment section (40) which, due to the effect of the calcium hydroxide inputted immediately upstream of the pyrolysis operation, may be extremely simplified. In fact, this arrangement greatly reduces the acidic components, such as hydrogen chloride, sulphuric acid and fluoridric acid, which react inside the drum and are discharged along with coke into the waste quenching pool. As a result, each flue gas treatment section (40) only consists of a dry reactor for removing mercury and other pollutants by means of active carbon and hydrated lime, as well as a bag-type cloth filter (not shown). The filter captures the powders formed in the adsorption process, the salts formed in the neutralisation reactions and the particulate already present in the combustion gases.

The system's induced suction function is carried out by two single-stage centrifuge fans (41) suitable for heavy duty continuous work and for open-air installation in dusty environments. Downstream of the fans (41) along the flue gas path there is a stack (42).

As already repeatedly stressed, the plant and process modifications made to the conventional solid waste treatment process by pyrolysis can drastically reduce the amount of final waste matter produced by the process. This final waste is not only much lower than the 50% seen with traditional "waste-to-energy" facilities, but is also essentially lower than the 30% on average achieved by conventional pyrolysis plants currently in operation.

Moreover, the process and relative plant proposed according to the present invention still allow maintaining the undisputed advantage of pyrolysis with respect to traditional "waste-to-energy" plants, consisting of the possibility of a multimaterial feed that is currently impossible for thermovalorizators and, above all, for conventional gasification plants, where the gas quality and thus process efficiency is extremely variable depending on variations of the incoming fuel. The pyrolysis process, instead, perfectly absorbs every variation of the incoming material, and any possible changes do not affect process performance itself.

The present invention has been disclosed with particular reference to some specific embodiments thereof, but it should be understood that modifications and changes may be made by the persons skilled in the art without departing from the scope of the invention as defined in the appended claims.

The invention claimed is:

1. A process for the treatment, by pyrolysis, of solid waste made up at least in part of municipal solid waste, wherein the waste to be treated undergoes a pyrolysis stage inside one or more rotary drum reactors with the production of a pyrolysis gas stream and a carbonaceous solid residue essentially composed of pyrolysis coke, characterized by the fact that the waste to be treated is preliminarily separated into three fractions, the first one of which, of smaller particle size and greater moisture contents, is subjected to a preliminary drying step in one or more rotary drum driers before being fed—together with the other waste fractions—to the pyrolysis stage, and by the fact that the carbonaceous solid waste obtained from the pyrolysis stage is further subjected to a gasification step to recover a further synthesis gas fraction, which is subsequently added to the pyrolysis gas stream to be fed to an energy recovery stage with the production of thermal energy, the solid residue of the gasification step substantially representing the final waste matter of the entire process, wherein the three fractions include, besides the first fraction of smaller particle size and greater moisture contents and a second dry fraction of larger particle size than the first one, also a third fraction, dry and of even coarser size than the second one, which is subjected to a preliminary shredding step to homogenize its size to the second fraction before being fed, together with the other waste fractions, to the pyrolysis stage.

2. A process according to claim 1, wherein the first fraction of smaller particle size and greater moisture contents has size lower than 80 mm and an initial humidity ranging between 55% and 60%, while the residual humidity after the preliminary drying step is of 20-25%.

3. A process according to claim 1, wherein the second dry fraction has size ranging between 80 mm and 300 mm, and the third dry fraction of even coarser size has starting size above 300 mm.

4. A process according to claim 1, wherein the preliminary drying of the first fraction of waste in the one or more rotary drum driers is carried out by using, as heating fluid, steam drawn off in the thermal energy production stage.

5. A process according to claim 1, wherein the energy recovery stage with the production of thermal energy is carried out by subjecting the pyrolysis gas stream and the synthesis gas stream to combustion inside a combustion chamber, with the production of heat which is used to heat the pipes of a steam boiler.

6. A process according to claim 5, wherein the one or more rotary drum pyrolysis reactors are indirectly heated by circulating, outside each of the drums, the gases drawn off from the combustion chamber.

7. A process according to claim 1, wherein the gasification step for recovering a further synthesis gas fraction is carried out by feeding the carbonaceous solid waste obtained from the pyrolysis stage, after eliminating any ferrous components, into one or more rotary drum gasification reactors, with the production of the further synthesis gas fraction as a gaseous product, and a solid residue further depleted of carbon as the final waste of the process.

8. A process according to claim 7, wherein the quantity of the solid residue obtained from the gasification operation is 10-15% of the total weight of the initial waste material fed into the process.

9. A process according to claim 7, wherein the volume of the solid residue obtained from the gasification operation is 5-10% of the total volume of the initial waste material fed into the process.

10. A plant for the treatment, by pyrolysis, of solid waste made up at least in part of municipal solid waste comprising the following interconnected main elements:
A) a waste reception and storage section;
B) a waste pre-treatment section providing for separation of the waste into three fractions of which the first one, of smaller particle size and greater moisture contents, is fed into one or more rotary drum driers, and the third one, dry and of coarser size, is fed to one or more shredders;
C) a section for the pyrolysis of the three waste fractions coming from the previous pre-treatment section and brought together, comprising one or more rotary drum pyrolysis reactors, which yield a pyrolysis gas stream and a carbonaceous solid residue;
D) a gasification section for the carbonaceous solid residue obtained from the previous section, comprising one or more rotary drum gasification reactors, which yield a synthesis gas stream and a solid residue substantially representing the final waste matter of the entire process;
E) a thermal energy production section starting from the joint streams of pyrolysis gas and synthesis gas, comprising a combustion chamber for the gases;
F) a section for the treatment and evacuation of flue gas with an annexed stack.

11. A plant according to claim 10, comprising the following further element:
an electrical power production section starting from the thermal energy produced in section E), comprising a steam generator that feeds a steam turbine connected to a power generator.

12. A plant according to claim 10, wherein separating the waste separation into three fractions is carried out by passing the waste material into one or more rotary screens.

13. A plant according to claim 10, wherein the rotary drum driers use, as heating fluid, steam drawn off from the steam generator.

14. A plant according to claim 10, wherein the one or more rotary drum pyrolysis reactors use, as heating fluid, the hot gases drawn off from the combustion chamber.

15. A plant according to claim 10, wherein down-stream of each of the one or more pyrolysis reactors along the path of the pyrolysis gas there is provided an electrostatic separator for depulverising the pyrolysis gas.

16. A plant according to claim 10, wherein the one or more rotary drum gasification reactors are fed with air as the gasification agent, which is fed in through controlled injection diffusers.

17. A plant according to claim 10, wherein the gasification section for the carbonaceous solid residue also comprises a treatment section for the solid residue representing the final waste matter of the process, with a quenching pool for the waste.

18. A plant according to claim 10, wherein the pyrolysis section also includes a section for eliminating the ferrous components from the carbonaceous solid residue obtained from the pyrolysis.

19. A plant according to claim 10, wherein the flue gas treatment section comprises a bag-type cloth filter and a dry reactor for removing mercury and other pollutants by means of active carbon and hydrated lime.

* * * * *